United States Patent
Chin et al.

(10) Patent No.: US 10,963,419 B1
(45) Date of Patent: Mar. 30, 2021

(54) SYSTEM AND METHOD FOR HANDLING IN-BAND INTERRUPTS ON INACTIVE I3C CHANNELS

(71) Applicant: DELL PRODUCTS, LP, Round Rock, TX (US)

(72) Inventors: Jordan Chin, Austin, TX (US); Timothy M. Lambert, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 16/802,961

(22) Filed: Feb. 27, 2020

(51) Int. Cl.
  *G06F 13/42* (2006.01)
  *G06F 13/40* (2006.01)
  *G06F 13/24* (2006.01)
  *G06F 11/34* (2006.01)
  *H04L 29/12* (2006.01)
  *H04L 12/403* (2006.01)

(52) U.S. Cl.
  CPC ........ *G06F 13/4291* (2013.01); *G06F 11/349* (2013.01); *G06F 13/24* (2013.01); *G06F 13/4068* (2013.01); *H04L 12/403* (2013.01); *H04L 61/2038* (2013.01); *G06F 2213/0016* (2013.01)

(58) Field of Classification Search
  None
  See application file for complete search history.

(56) References Cited

U.S. PATENT DOCUMENTS

2008/0307148 A1  12/2008  Naderi et al.
2008/0307154 A1  12/2008  Naderi et al.

*Primary Examiner* — Farley Abad
*Assistant Examiner* — Dayton Lewis-Taylor
(74) *Attorney, Agent, or Firm* — Larson Newman, LLP

(57) ABSTRACT

A multiplexor for an Improved Inter-Integrated Circuit (I3C) network includes a switch, a snooper, and an I3C slave module coupled to an I3C master interface. The switch selectably couples I3C busses to the I3C master interface. Each I3C bus includes I3C slave interfaces. The selected I3C bus is the active bus, and the non-selected I3C busses are inactive buses. The snooper detects In-Band Interrupts (IBIs) from the I3C slave interfaces coupled to the inactive buses. When the snooper receives a first IBI on an inactive bus, the snooper provides an indication. The I3C slave module provides a second IBI to the I3C master interface in response to the indication.

20 Claims, 3 Drawing Sheets

SYSTEM AND METHOD FOR HANDLING IN-BAND INTERRUPTS ON INACTIVE I3C CHANNELS

FIELD OF THE DISCLOSURE

This disclosure generally relates to information handling systems, and more particularly relates to handling in-band interrupts on inactive I3C channels in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A multiplexor for an Improved Inter-Integrated Circuit (I3C) network may include a switch, a snooper, and an I3C slave module coupled to an I3C master interface. The switch may selectably couple I3C busses to the I3C master interface. Each I3C bus may include I3C slave interfaces. The selected I3C bus may be the active bus, and the non-selected I3C busses may be inactive buses. The snooper may detect In-Band Interrupts (*IBIS*) from the I3C slave interfaces coupled to the inactive buses. When the snooper receives a first IBI on an inactive bus, the snooper may provide an indication. The I3C slave module may provide a second IBI to the I3C master interface in response to the indication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
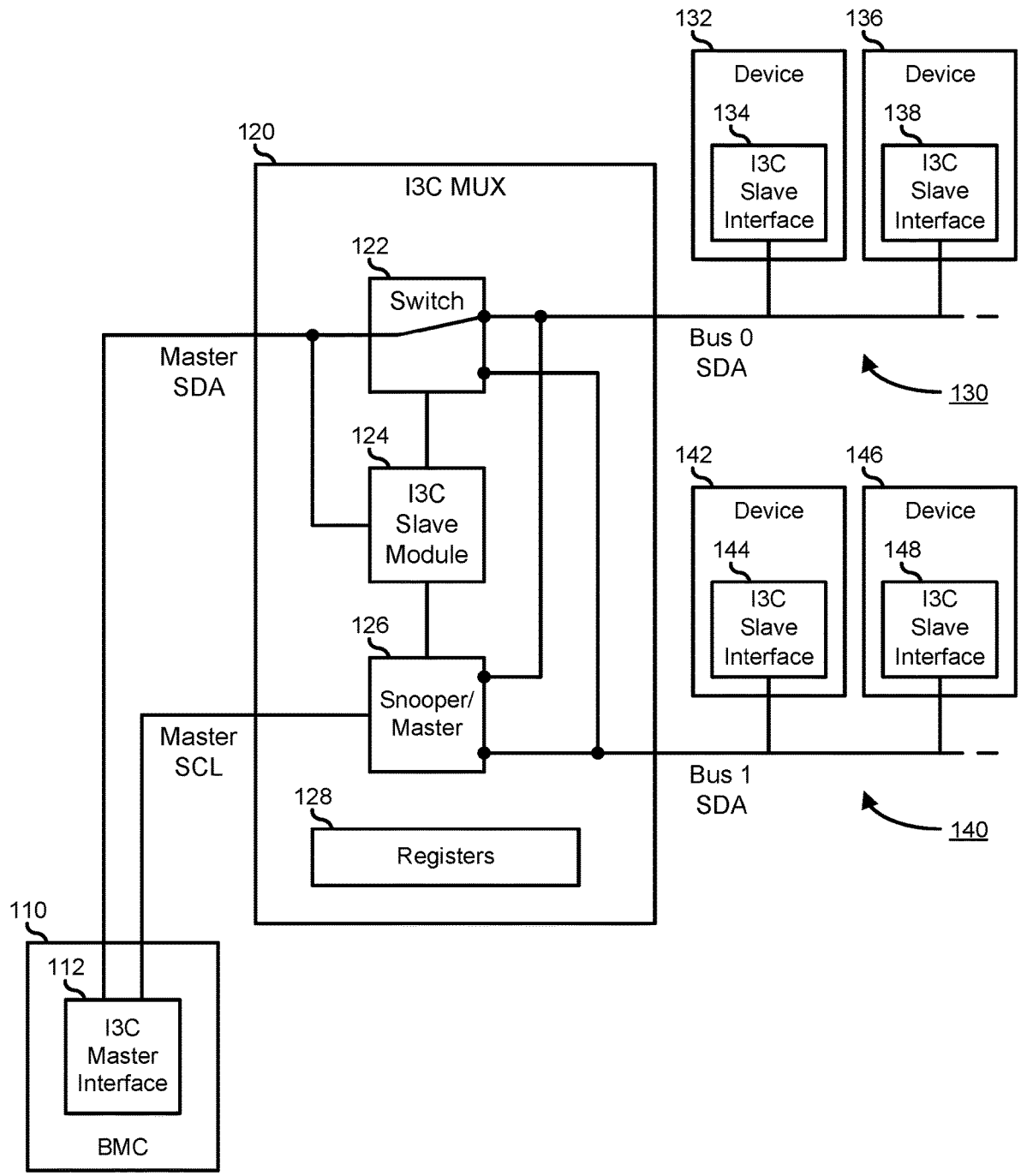
FIG. 1 is a block diagram illustrating an information handling system according to an embodiment of the present disclosure.

FIG. 1 illustrates an information handling system 100 including a baseboard management controller (BMC) 110 with an Improved Inter-Integrated Circuit (I3C) interface 112, a I3C multiplexor 120, and I3C buses 130 and 1 40. I3C multiplexor 120 includes a switch 122, a I3C slave module 12 4, a data line snooper/I3C master 126, and control and data registers 128. I3C is a two-wire multidrop serial data interface standard provided by the Mobile Industry Processor Interface (MIPI) Alliance, and serves as an evolution of the Serial Peripheral Interface (SPI) and Inter-Integrated Circuit (I2C) interface for providing side-band management and control of devices on information handling systems. Here, information handling system 100 may include a host processing system that represents the hardware, firmware, and software components that are typically associated with a computer or other information handing system, and that includes devices 132, 136, 142, and 146 as components for providing various processing tasks at in response to the execution of machine-executable code by a processor of the information handling system.

Information handing system 100 may further include a management system that represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for the information handling system. As such, BMC 110 and I3C multiplexor 120 are connected to devices 132, 136, 142, and 146 via respective I3C slave interfaces 134, 138, 144, and 148 to provide an out-of-band (OOB) mechanism to retrieve information related to the operation of the devices and the host environment, to provide BIOS/ UEFI or system firmware updates, to manage non-processing components of information handling system 100, such as system cooling fans and power supplies. An example of BMC 110 may include a commercially available BMC product or other device that operates in accordance with an Intelligent Platform Management Initiative (IPMI) specification, a Web Services Management (WS-MAN) interface, a Redfish or other Distributed Management Task Force (DMTF) standard, or another managed system standard, and can include one or more devices such as an Integrated Dell Remote Access Controller (iDRAC), an Embedded Controller (EC), or the like. Information handling system 100 may include additional memory devices, logic devices, security devices, or the like, as needed or desired.

I3C master interface 112 is connected via a data line (SDA) to switch 122 and to I3C slave module 124, and the switch selectively connects the data line (SDA) to the data lines of either I3C bus 130 (bus 0) or I3C bus 140 (bus 1). The data lines (SDA) of I3C buses 130 and 140 are connected to data line snooper/I3C master 126. I3C slave module 124 is connected to switch 122 to receive an indication as to which one of I3C buses 130 or 140 is currently connected to I3C master interface 112. I3C slave module 124 is also connected to data line snooper/I3C master 126. I3C master interface 112 is also connected via a clock line (SCL) to data line snooper/I3C master 126. It will be understood that switch 122 is further configured to selectively provide a clock line (SCL) to each of I3C buses 130 and 140. However, for the simplification of illustration, the clock lines (SCL) to I3C buses 130 and 140 are not illustrated. Information handling system 100 may include one or more additional I3C buses similar to I3C buses 130 and 140, and I3C multiplexor 120 may include elements configured to handle the additional I3C buses, such as additional data line (SDA) inputs to switch 122 and to data line snooper/I3C master 126. Registers 128 will be described below.

The I3C interface provides several improvements over previous two-wire low-speed interfaces, such as SPI and I2C. In particular, I3C provides faster data rates to accommodate the larger number of I3C connected devices. For example, a typical DDR5 DIMM may include six or more I3C slave interfaces (one for a Serial Presence Detect (SPD) hub, one for a Power Management Integrated Circuit (PMIC), one for a Register Control Device (RCD), three or more for temperature sensors, etc.), and a typical server system may include multiple processors that each support up to eight DIMMs on a memory channel, for a total of forty-eight or more I3C slave interfaces per memory channel, in addition to other I3C connected devices that are not associated with the memory channels. Additionally, the I3C interface supports dynamic addressing and address remapping that permits an information handling system to flexibly allocate resources for servicing the multiple I3C interfaces, without being tied to determining the allocation based upon prior fixed addressing schemes. Further, the I3C interface provides Common Command Codes (CCC) that permit for more unified management of the I3C connected devices. Finally, the I3C interface provides for I3C slave devices to issue in-band interrupts (IBI) over the two-wire interface. Here, an I3C slave device can issue an IBI by one of two methods. In the first method, described herein as a "reactive IBI," after an I3C master device generates a START condition, the I3C slave interfaces on a common I3C bus can each transmit their I3C addresses onto the data line (SDA). In the second method, described herein as a "proactive IBI," an I3C slave device can issue a START condition by pulling the data line (SDA) line low. In response, the I3C master device clocks the clock line (SCL) and the I3C slave device drives its I3C address onto the data line (SDA). In either case, a data payload (Mandatory Data Byte (MDB)) can be provided with the I3C address.

In operation, only one of buses 130 and 140 will be active, that is, connected via switch 122 to I3C master interface 112, at any particular time. As such, a START condition generated by I3C master interface 112 will only be provided to the I3C interfaces that are on the active bus: I3C slave interfaces 134 and 138 when bus 130 is connected, and I3C slave interfaces 144 and 148 when bus 140 is connected. Here, only the I3C slave interfaces on the active bus will receive the START condition and be able to provide a reactive IBI in response. That is, the I3C slave interfaces that are on the inactive bus will never see the START condition, and so will never provide reactive IBIs. On the other hand, all of I3C slave interfaces 134, 138, 144, and 148 may issue proactive IBIs by pulling the data lines (SDA) on their respective buses 130 or 140 low, and waiting for I3C master interface 112 to clock the clock line (SCL) to drive its I3C address onto the data line (SDA). However, because only one of buses 130 and 140 are active, the proactive IBIs from the I3C slave interfaces on the inactive bus will not get transmitted to the I3C master interface, and will never receive the clock on the inactive clock line (SCL). One solution to detecting proactive IBIs from I3C slave interfaces on the inactive bus is to periodically poll for I3C slave interfaces on the inactive bus to determine if any undetected proactive IBIs have been issued. Here, I3C multiplexor 120 must first be directed to switch from connecting the previously inactive bus to I3C master interface 112. This may be done by a command to I3C multiplexor 120 from BMC 110 via I3C master interface 112, or another side-band mechanism to direct I3C multiplexor 120 to switch the buses. However, this solution has the disadvantages of periodically switching buses, and the polling of all of the I3C slave interfaces on the previously inactive bus. In particular, with the increased number of I3C connected devices in the typical server system, the amount of time needed to switch busses and poll the previously inactive devices may be extreme, and act to counter any advantages gained by the faster data transfer rates of the I3C interface.

Data line snooper/I3C master 126 is connected to the data lines (SDA) of both buses 130 and 140, and to the clock line (SCL) from I3C master interface 112. Data line snooper/I3C master 126 operates to detect when the data lines (SDA) on buses 130 and 140 are pulled low, indicating the start of a proactive IBI. Then, if I3C master interface 112 provides the clock signal on the clock line (SCL), then data line snooper/I3C master 126 determines that the proactive IBI is on the active bus, and no action is needed to communicate the proactive IBI to the I3C master interface. However, if I3C master interface 112 does not provide the clock signal on the clock line (SCL), then data line snooper/I3C master 126 determines that the proactive IBI is on the inactive bus, and the I3C multiplexor 120 operates to proxy the proactive IBI to the I3C master interface. I3C multiplexor 120 operates to proxy proactive IBIs from inactive buses via one of two methods.

In the first method, referred to as a pass-through mode, data line snooper/I3C master 126 provides an indication that a proactive IBI has been generated on an inactive bus to I3C slave module 124, and the I3C slave module generates a proactive IBI on the data line (SDA) to I3C master interface 112 by pulling the data line (SDA) low. Then when I3C master interface 112 provides the clock signal on the clock line (SCL), I3C slave module 124 drives its I3C address onto the data line (SDA), along with a data payload (MDB) that indicates which inactive bus has the unserviced proactive IBI. In response, BMC 110 directs I3C multiplexor 120 to connect the inactive bus to I3C master interface 112, the I3C master interface provides the clock signal on the clock line (SCL), and the I3C slave interface that generated the proactive IBI drives its I3C address onto the data line (SDA).

In the second method, referred to as a proxy mode, data line snooper/I3C master 126 operates as a I3C master interface, driving a clock signal onto the clock line (SCL) of the inactive bus. In response, the I3C slave interface that generated the proactive IBI provides its I3C address on the data line (SDA) to data line snooper/I3C master 126. Data line snooper/I3C master 126 then provides an indication that a proactive IBI has been generated on an inactive bus to I3C slave module 124. The indication includes the I3C address of the I3C slave interface that generated the proactive IBI. I3C slave module 124 then generates a proactive IBI on the data line (SDA) to I3C master interface 112 by pulling the data line (SDA) low. Then when I3C master interface 112 provides the clock signal on the clock line (SCL), I3C slave module 124 drives the I3C address of the I3C slave interface that generated the proactive IBI onto the data line (SDA). In response, BMC 110 determines that the I3C address of the I3C slave interface that generated the proactive IBI is on an inactive bus, and directs I3C multiplexor 120 to connect the inactive bus to I3C master interface 112, and the I3C master interface services the proactive IBI. In a particular embodiment, when a proactive IBI is detected on an inactive bus, I3C multiplexor 120 operates to determine whether or not other transactions are occurring on the active bus. If not, then I3C multiplexor 120 operates to automatically switch to connect the inactive bus to I3C master interface 112. In this embodiment, the servicing of interrupts can proceed normally, while the connections to the various buses can be dynamically handled based upon which bus is currently being serviced and which buses are generating proactive IBIs.

I3C slave module 124 is further operable to act as a I3C slave interface to provide for the control and operation of I3C multiplexor 120. In particular, I3C slave module 124 has an assignable I3C address and can write control information to registers 128 and provide data from the registers to I3C master interface 112. As such, registers 128 may include switch operation bit locations that provide for the control of switch 122, whereby the setting of a particular switch operation bit location operates to switch an associated bus to be connected to I3C master interface 112. In a particular embodiment, the setting of any one switch operation bit location may operate to clear all other switch operation bit locations, so that only one bus is connected to I3C master interface 112 at a time. Registers 128 may further include IBI control bit locations that enable IBI snooping by data line snooper/I3C master 126, and that set whether I3C multiplexor 120 operates in the pass-through mode or in the proxy mode. Registers 128 may also include IBI status bit locations, one each being associated with a different bus. The IBI status bit locations are readable to indicate if any IBIs are pending on associated buses. Each IBI status bit location may include an associated slave address field that provides the I3C address associated with pending IBIs.

Figure 2:
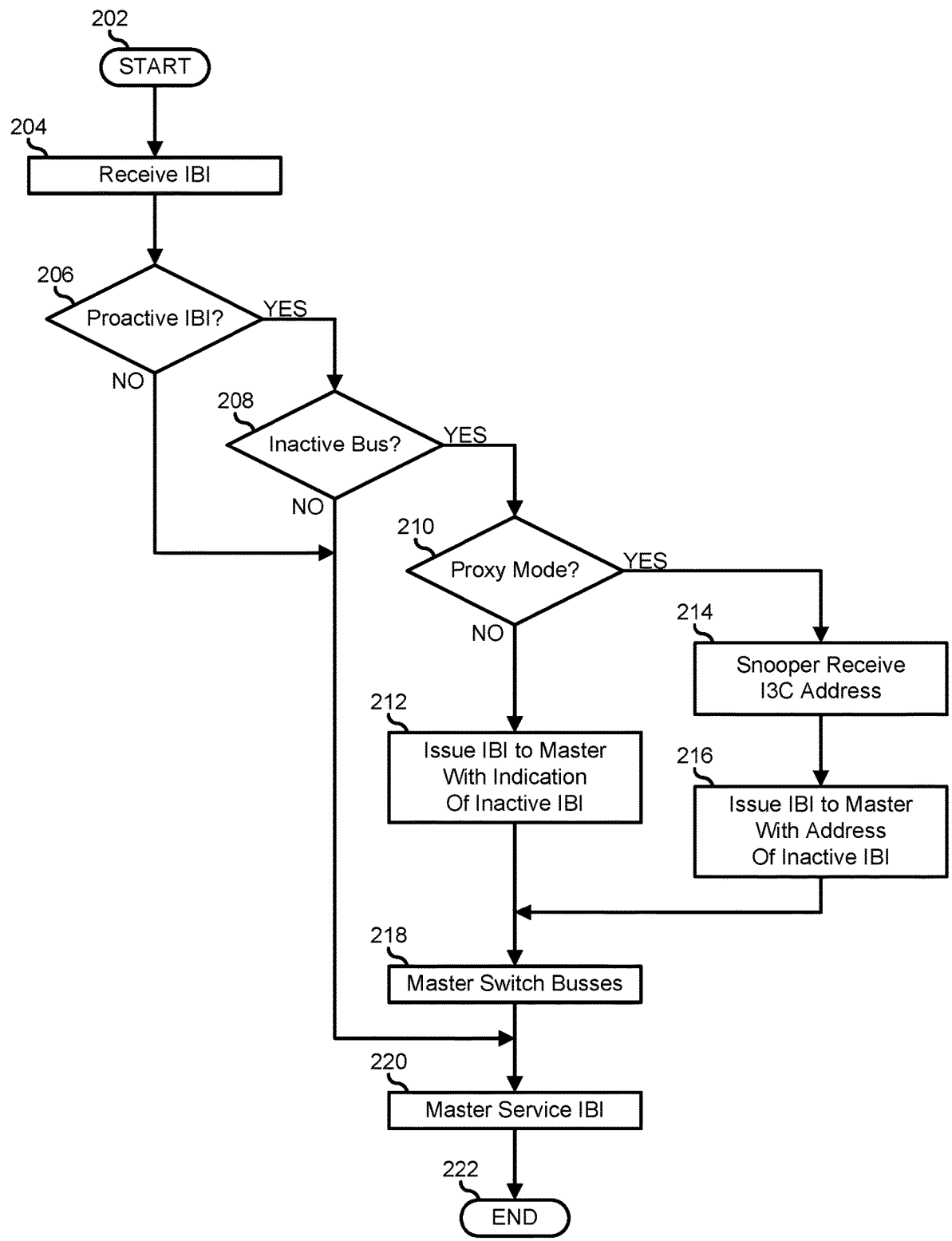
FIG. 2 is a flowchart illustrating a method for handling in-band interrupts on inactive I3C channels in an information handling system according to an embodiment of the present disclosure.

FIG. 2 illustrates a method for handling in-band interrupts on inactive I3C channels in an information handling system, starting at block 202. A data line snooper of an I3C multiplexor receives an IBI from an I3C slave interface in block 204, and makes a determination as to whether or not the IBI is a proactive IBI from the I3C slave interface in decision block 206. If not, the "NO" branch of decision block 206 is taken, indicating that the IBI is a reactive IBI from the I3C slave interface, the I3C master interface services the reactive IBI in block 220, and the method ends in block 222. If the IBI is a proactive IBI from the I3C slave interface, the "YES" branch of decision block 206 is taken and a decision is made as to whether or not the proactive IBI was received on an inactive bus in decision block 208. If not, the "NO" branch of decision block 208 is taken, indicating that the I3C master is already connected to the proper bus, the I3C master interface services the reactive IBI in block 220, and the method ends in block 222.

If the proactive IBI was received on an inactive bus, the "YES" branch of decision block 208 is taken and a decision is made as to whether or not the I3C multiplexor is in the proxy mode in decision block 210. If not, the "NO" branch of decision block 210 is taken, indicating that the I3C multiplexor is in the pass-through mode, and an I3C slave module of the I3C multiplexor issues an IBI to the I3C master interface, and, when the I3C master interface responds to the IBI, the I3C slave module provides an indication as to which inactive bus generated the IBI in block 212. The I3C master directs the I3C multiplexor to switch to the bus that generated the IBI and responds to the IBI on the bus in block 216, the I3C master interface services the reactive IBI in block 220, and the method ends in block 222. If the I3C multiplexor is in the proxy mode, the "YES" branch of decision block 210 is taken, and the snooper, acting as a I3C master interface, responds to the proactive IBI on the inactive bus to receive the I3C address of the I3C interface that generated the IBI in block 214. The I3C slave module issues a proactive IBI to the I3C master device and provides the I3C address of the I3C slave interface that generated the IBI in block 216. The I3C master directs the I3C multiplexor to switch to the bus that generated the IBI and responds to the IBI on the bus in block 216, the I3C master interface services the reactive IBI in block 220, and the method ends in block 222.

Figure 3:
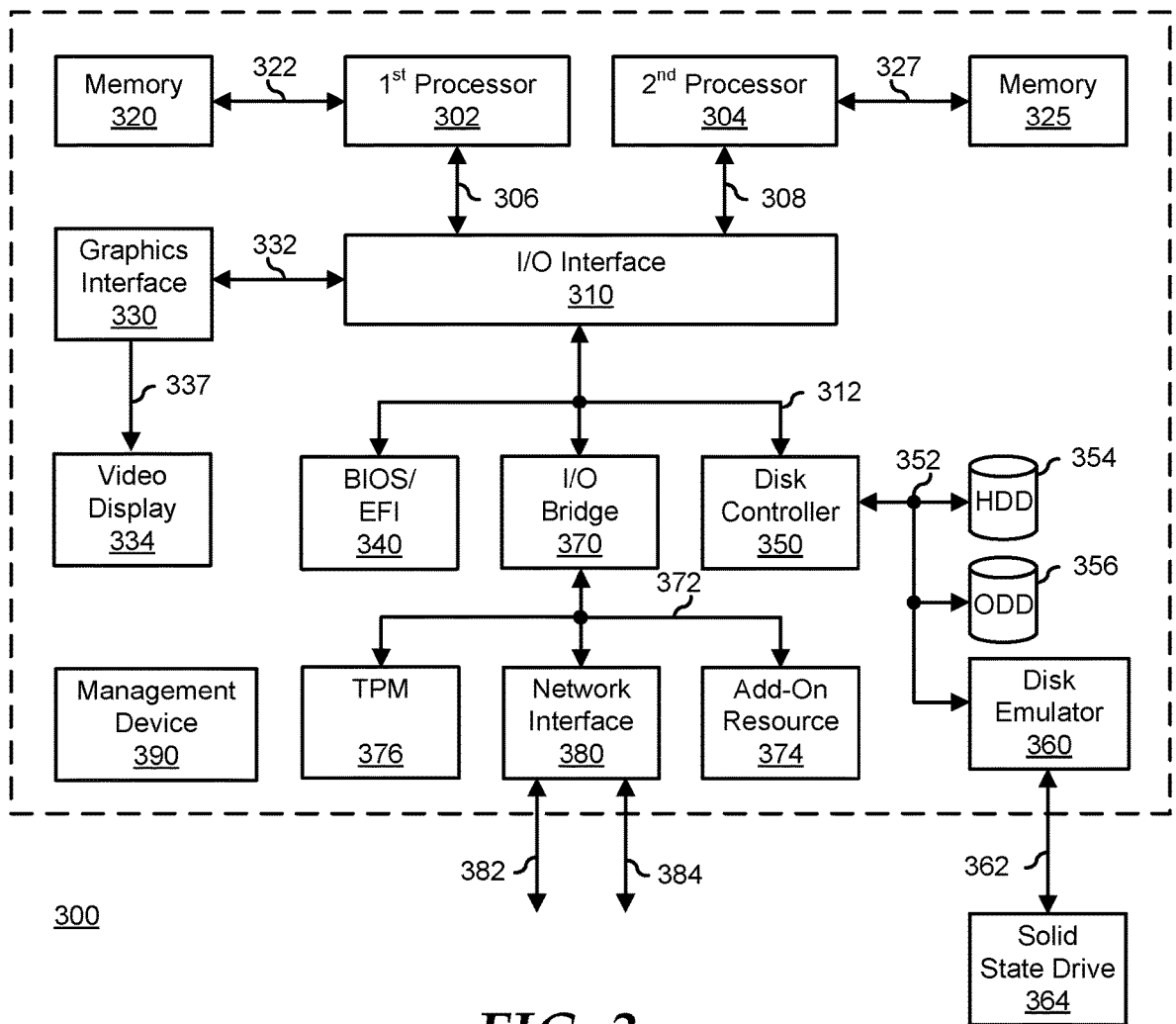
FIG. 3 is a block diagram illustrating a generalized information handling system according to another embodiment of the present disclosure.

FIG. 3 illustrates a generalized embodiment of an information handling system 300 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated BMC SoC device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an I2C or I3C interface, a PCIe interface, or the like, to provide an out-of-band mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an IPMI specification, a WSMan interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multiplexor for an Improved Inter-Integrated Circuit (I3C) network, the multiplexor comprising:
    a switch to couple a first I3C master interface to a selectable one of a plurality of I3C buses, each I3C bus being coupled to a plurality of I3C slave interfaces, a selected one of the I3C buses being an active bus, and the non-selected ones of the I3C busses being inactive buses;
    a snooper to detect In-Band Interrupts (IBIs) from the I3C slave interfaces coupled to the inactive buses, the snooper configured to receive a first IBI from a first I3C slave interface coupled to a first inactive bus, and to provide an indication when the first MI is received, the first I3C slave interface having a first I3C address; and
    an I3C slave module coupled to the first I3C master interface, and configured to receive the indication and to provide a second IBI to the first I3C master interface in response to the indication, the I3C slave module having a second I3C address.

2. The multiplexor of claim 1, wherein, in providing the second IBI, the I3C slave module is further configured to provide the second I3C address to the first I3C master interface.

3. The multiplexor of claim 2, wherein in providing the second IBI, the I3C slave module is further configured to provide a data payload indicating that the first IBI was provided on the first inactive bus.

4. The multiplexor of claim 3, wherein the I3C slave module is further configured to receive a reply from the first I3C master interface in response to the second IBI, the reply including an instruction for the switch to decouple a first active bus from the first I3C master interface and to couple the first inactive bus to the first I3C master interface.

5. The multiplexor of claim 1, further comprising:
    a second I3C master interface configured to determine the first I3C address in response to receiving the first IBI.

6. The multiplexor of claim 5, wherein the second I3C master interface is further configured to provide the first I3C address to the I3C slave module.

7. The multiplexor of claim 6, wherein, in providing the second IBI, the I3C slave module is further configured to provide the first I3C address to the second I3C master interface.

8. The multiplexor of claim 7, wherein the multiplexor is configured to decouple a first active bus from the first I3C master interface and to couple the first inactive bus to the second I3C master interface in response to providing the first I3C address to the second I3C master interface.

9. A method for an improved inter-integrated circuit (I3C) network, the method comprising:
    coupling, by a switch of an I3C multiplexor, a first I3C master interface to a selectable one of a plurality of I3C buses, each I3C bus being coupled to a plurality of I3C slave interfaces, the selected one of the I3C buses being an active bus, and the non-selected ones of the I3C busses being inactive buses;
    detecting, by a snooper of the I3C multiplexor, a first In-Band Interrupts (MI) from a first I3C slave interface coupled to a first inactive bus, the first I3C slave interface having a first I3C address;
    providing an indication that the first IBI was received;
    receiving, by an I3C slave module of the I3C multiplexor, the indication; and
    providing a second IBI to the first I3C master interface in response to the indication.

10. The method of claim 9, wherein, in providing the second IBI, the method further comprises:
    providing, by the I3C slave module, the first I3C address to the first I3C master interface.

11. The method of claim 10, wherein, in providing the second IBI, the method further comprises:
    providing, by the I3C slave module, a data payload indicating that the first IBI was provided on the first inactive bus.

12. The method of claim 11, further comprising:
    receiving, by the I3C slave module, a reply from the first I3C master interface in response to the second IBI, the reply including an instruction for the switch to decouple a first active bus from the first I3C master interface and to couple the first inactive bus to the first I3C master interface.

13. The method of claim 9, further comprising:
    determining, by a second I3C master interface of the I3C multiplexor, the first I3C address in response to receiving the first IBI.

14. The method of claim 13, further comprising:
    providing, by the second I3C master, the first I3C address to the I3C slave module.

15. The method of claim 14, wherein, in providing the second IBI, the method further comprises:
    providing, by the I3C slave module, the first I3C address to the second I3C master interface.

16. The method of claim 15, further comprising:
    decoupling, by the I3C multiplexor, a first active bus from the first I3C master interface in response to providing the first I3C address to the second I3C master interface; and
    coupling the first inactive bus to the second I3C master interface.

17. An information handling system, comprising:
    a first I3C master interface; and
    a multiplexor for an I3C network, the multiplexor including:

a switch to couple the first I3C master interface to a selectable one of a plurality of I3C buses, each I3C bus being coupled to a plurality of I3C slave interfaces, a selected one of the I3C buses being an active bus, and the non-selected ones of the I3C busses being inactive buses;

a snooper to detect In-Band Interrupts (IBIs) from the I3C slave interfaces coupled to the inactive buses, the snooper configured to receive a first IBI from a first I3C slave interface coupled to a first inactive bus, and to provide an indication when the first IBI is received, the first I3C slave interface having a first I3C address; and an I3C slave module coupled to the first I3C master interface, and configured to provide a second IBI to the first I3C master interface in response to the indication, the I3C slave module having a second I3C address.

18. The information handling system of claim 17, wherein, in providing the second IBI, the I3C slave module is further configured to provide the second I3C address to the first I3C master interface.

19. The information handling system of claim 17 wherein:
the multiplexor further comprises a second I3C master interface configured to determine the first I3C address in response to receiving the first IBI, and to provide the first I3C address to the I3C slave module; and in providing the second IBI, the I3C slave module is further configured to provide the first I3C address to the second I3C master interface.

20. The information handling system of claim 19, wherein the multiplexor is configured to decouple a first active bus from the first I3C master interface and to couple the first inactive bus to the second I3C master interface in response to providing the first I3C address to the second I3C master interface.

* * * * *

UNITED STATES PATENT AND TRADEMARK OFFICE
CERTIFICATE OF CORRECTION

| | |
|---|---|
| PATENT NO. | : 10,963,419 B1 |
| APPLICATION NO. | : 16/802961 |
| DATED | : March 30, 2021 |
| INVENTOR(S) | : Jordan Chin et al. |

It is certified that error appears in the above-identified patent and that said Letters Patent is hereby corrected as shown below:

In the Claims

Column 9, Line 44: Claim 1 change "the first MI" to --the first IBI--

Column 10, Line 22: Claim 9 change "(MI)" to --(IBI)--

Signed and Sealed this
Twenty-first Day of June, 2022

*Katherine Kelly Vidal*

Katherine Kelly Vidal
*Director of the United States Patent and Trademark Office*